United States Patent
Chang et al.

(10) Patent No.: US 6,734,639 B2
(45) Date of Patent: May 11, 2004

(54) SAMPLE AND HOLD METHOD TO ACHIEVE SQUARE-WAVE PWM CURRENT SOURCE FOR LIGHT EMITTING DIODE ARRAYS

(75) Inventors: Chin Chang, Yorktown Heights, NY (US); Bernd Clauberg, Schaumburg, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 09/930,735

(22) Filed: Aug. 15, 2001

(65) Prior Publication Data

US 2003/0034742 A1 Feb. 20, 2003

(51) Int. Cl.[7] .................................................. G05F 1/00
(52) U.S. Cl. ........................ 315/291; 315/224; 363/21; 345/76
(58) Field of Search .............................. 345/76, 78, 36, 345/37, 101; 315/291, 292, 312, 362, 300, 308, 224

(56) References Cited

U.S. PATENT DOCUMENTS

| | | | |
|---|---|---|---|
| 3,578,908 A | * 5/1971 | Tompkins | 348/680 |
| 4,890,210 A | * 12/1989 | Myers | 363/21.11 |
| 5,184,114 A | 2/1993 | Brown | 340/701 |
| 5,594,463 A | 1/1997 | Sakamoto | 345/76 |
| 5,708,452 A | 1/1998 | Takahashi | 345/82 |
| 5,812,105 A | 9/1998 | Van de Ven | 345/83 |
| 6,016,038 A | 1/2000 | Mueller et al. | 315/291 |
| 6,097,360 A | 8/2000 | Holloman | 345/84 |
| 6,118,259 A | * 9/2000 | Bucks et al. | 323/312 |
| 6,150,774 A | 11/2000 | Mueller et al. | 315/291 |

* cited by examiner

*Primary Examiner*—Don Wong
*Assistant Examiner*—Jimmy T. Vu

(57) ABSTRACT

An apparatus for controlling overshoots in the switching of LED arrays in a system having a switching voltage converter providing the biasing voltage for the LED array. By synchronizing a switching converter to an LED turn-on signal, loading on the voltage converter can be controlled such that output conduction of the converter only occurs when LEDs that are to be displayed are switched on to provide loading to the output of the converter. A Sample and hold method is employed to effectively store the current information in a previous "on" interval and use it for the current control in a following interval with inhibited current overshoot.

18 Claims, 2 Drawing Sheets

SAMPLE AND HOLD METHOD TO ACHIEVE SQUARE-WAVE PWM CURRENT SOURCE FOR LIGHT EMITTING DIODE ARRAYS

FIELD OF THE INVENTION

This invention relates to the field of LED drive circuits, and more particularly to a method for driving an LED array using a sample and hold method to achieve square wave PWM current waveform required by LED loads.

BACKGROUND OF THE INVENTION

Conventional LED array driver circuits typically use an inexpensive linear voltage regulator to provide a $V_{cc}$ biasing rail as an energy source for LEDs to be displayed. When an LED is selected for lighting, a semiconductor switching device, such as a transistor, is activated to provide a current path through the selected LED(s). At the end of the display period, the device is then turned off. A significant drawback of such a voltage driving arrangement is that voltage overshoots occur at the time of turn off of the switching device due to continued conduction of the source regulator at the instant of turn off. This event presents a condition wherein a large filtering capacitor is receiving charge from the linear regulator at the instant of removal of the LED loading. Then, at the next turn-on cycle of the LED, a higher voltage is present on the voltage biasing rail, causing large leading current spikes at that voltage transition. These overshoots can be injected into neighboring circuitry with degrading or destructive effect both to the circuits and the LED.

To eliminate such overshoot problems, circuits are configured to create a constant current source from a linear voltage regulator. FIG. 1 shows such a conventional LED driver circuit 10, having a first amplifier 12 for amplifying an $I_{LED}$ signal present at node 14 and a second amplifier 16 for controlling the operation of the LED. In response to a logical switching signal 18, second amplifier 16 presents a regulated voltage signal 20 to transistor 22 to begin current conduction through LEDs 24. The resulting LED current, $I_{LED}$, is sensed via the sensing resistor 26 and is amplified by first amplifier 12 to provide a current feedback signal to second amplifier 16. The Laplace transfer function of the second amplifier is governed by the equation $$\frac{R_A}{R_B} \frac{1}{1+sR_AC_1} \quad [1]$$

A linear time delay that is provided by the $R_AC_1$ impedance combination implements a low pass filter that reduces overshoot in $I_{LED}$, thereby allowing current signal $I_{LED}$ to follow reference signal 18. A disadvantage of such linear low pass filtering is the large overshoot in LED current during the turn-on of LEDs 24. For applications requiring LEDs 24 to be displayed using a pulse width modulated (PWM) mode at a high frequency, such as 400 Hz, and an exemplary duty cycle of 40%, substantial ripple current results in $I_{LED}$ that can cause degradation in the optical and electrical performance of the LEDs 24. This degradation can include loss of intensity control and accuracy, in addition to creation of noise signals that can interfere with the sampling scheme.

Thus, a need exists for an apparatus that can inhibit the overshoots while allowing high speed selectivity of the devices in an LED array.

SUMMARY

According to a preferred embodiment of the present invention, a circuit is provided for synchronizing the current feedback and control signals of an LED driving circuit with a second signal for driving a biasing power converter in order to eliminate voltage and current overshoots associated with LED loading discontinuities. By such synchronization, a switching device in the power converter which is connected to an energy source is inhibited during times when the LED load driving device is inhibited to prevent undesired charging of intermediate buffering capacitances. Through the use of gate clamping devices, a single logic signal, with inversion where appropriate, can cause all switching devices to turn-on and turn-off simultaneously. This invention is applicable to both flyback converters and push-pull converters.

Further, a sample and hold circuit preferably provides for an operating biasing level that will insure that a subsequent turn-on will having the same operating conditions that were present at a previous turn-on. The response time of such a sample and hold circuit will preferably be longer than the time period of the operating frequency of the converter.

The present invention also provides a method for synchronizing the switching LED driver to the switching device in the voltage converter such that both the activation time periods and the inactivation time periods coincide, and that no energy transfer is enabled if an energy load is not present.

DETAILED DESCRIPTION OF THE INVENTION

According to a preferred embodiment of the present invention, a non-linear sample and hold circuit allows for an accurate measurement and correction of an LED current signal, such that a driving signal 18 will be accurately followed without undue voltage and current overshoot and performance degradation.

Figure 1:
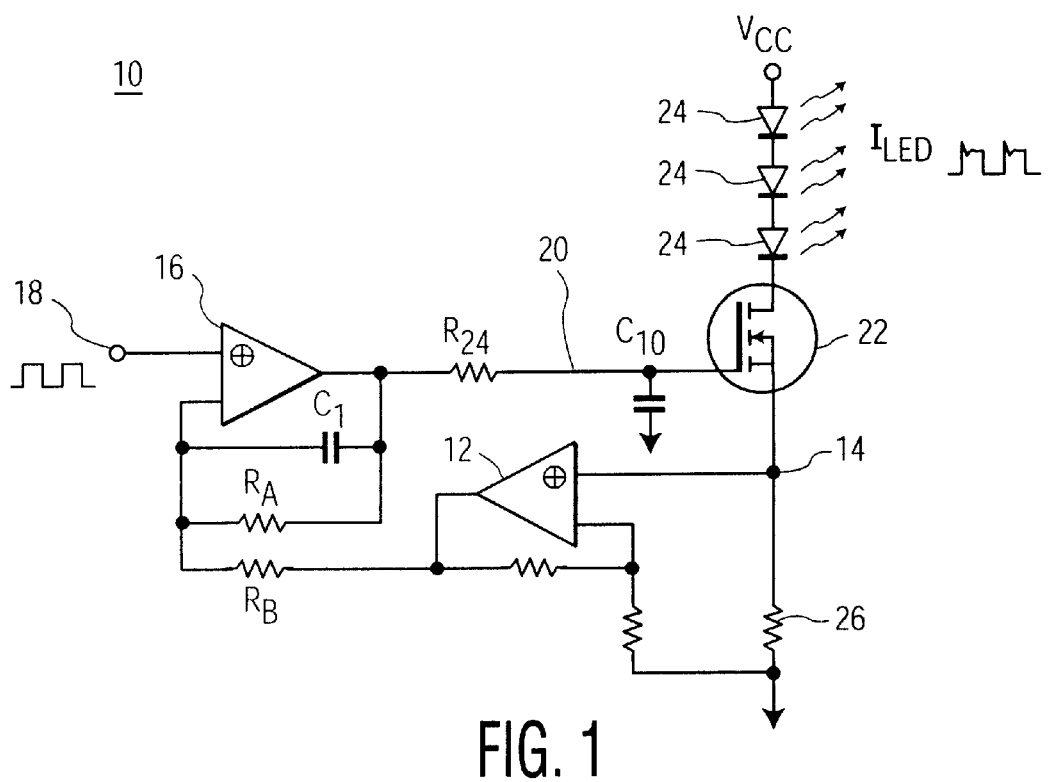
FIG. 1 shows a conventional LED driver circuit.
Figure 2:
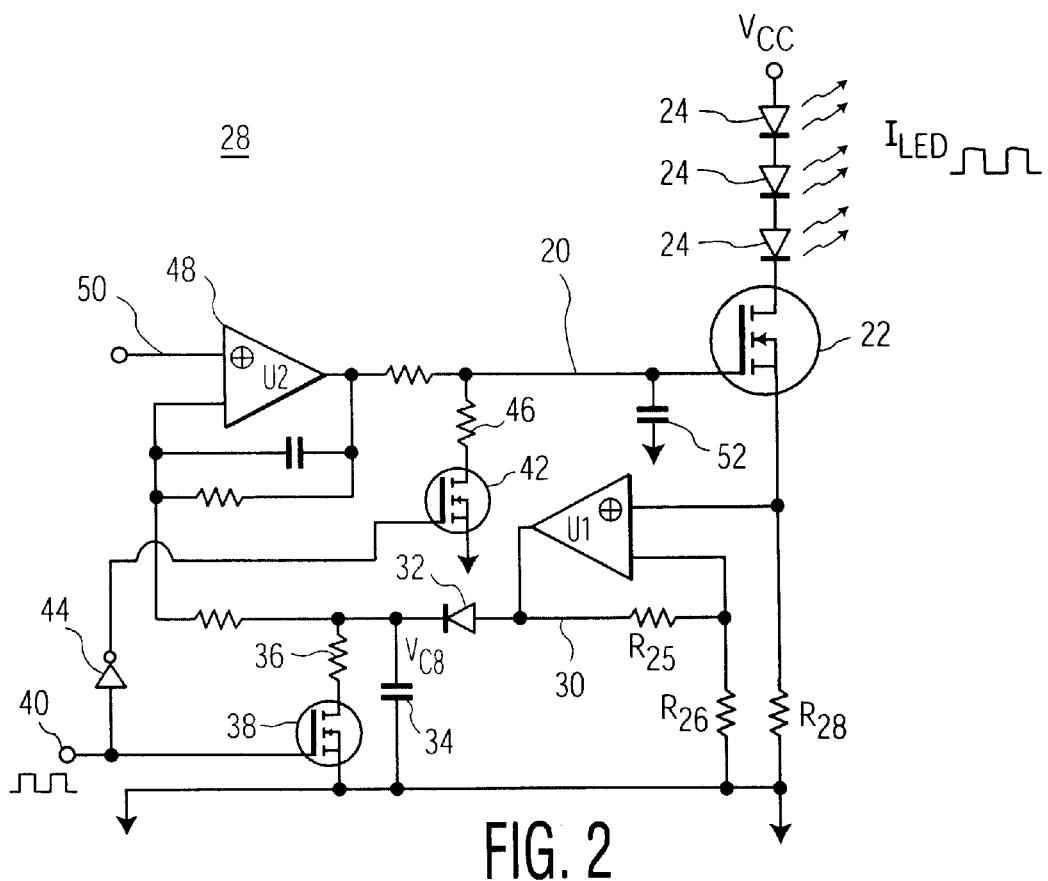
FIG. 2 shows an LED driver configuration according to a preferred embodiment of the present invention.

FIG. 2 shows an exemplary LED driver configuration 28 according to a preferred embodiment of the present invention. An amplified sense signal 30 is applied to an exemplary wave-shaping impedance combination of diode 32, capacitor 34, resistor 36, and the drain of MOSFET switching device 38, the input gate of which is controlled by an input voltage signal 40. A second MOSFET switching device 42 is also controlled by input signal 40 via logic inverter 44. This second switching device 42 provides a current sinking circuit through resistor 46 connected to the output of amplifier 48 and the gate of transistor 22. Amplifier 48 is biased similarly to amplifier 16 shown in FIG. 1, except that the positive input terminal is connected to a fixed reference voltage 50.

Due to inverter 44, switching devices 38 and 42 will be in opposite states in response to logic signal 40. When signal 40 is at a high voltage, switching device 38 turns on and switching device 42 turns off, thus allowing amplified signal 30 to pass to amplifier 48 and thence to output transistor 22, thereby turning on LED's 24. The feedback signal through the just describe loop regulates the current through LEDs 24 at an essentially constant magnitude for the duration of the applied pulse.

When signal 40 transitions low, switching device 38 turns off and switching device 42 turns on to pull the gate voltage of transistor 22 and its associated parasitic gate capacitance 52 to a level that is below its threshold, thereby turning off transistor 22 and LED's 24. The biasing resistors associated with the two switching devices 38 and 42 can be selected such that transistor 22 is only slightly below its threshold voltage. This allows turn on of transistor 22 without the need for gate overdrive levels that can produce the current overshoots in LEDs 24, since capacitors 34 and 52 are never completely discharged nor fully charged during the cyclic operation.

Figure 3:
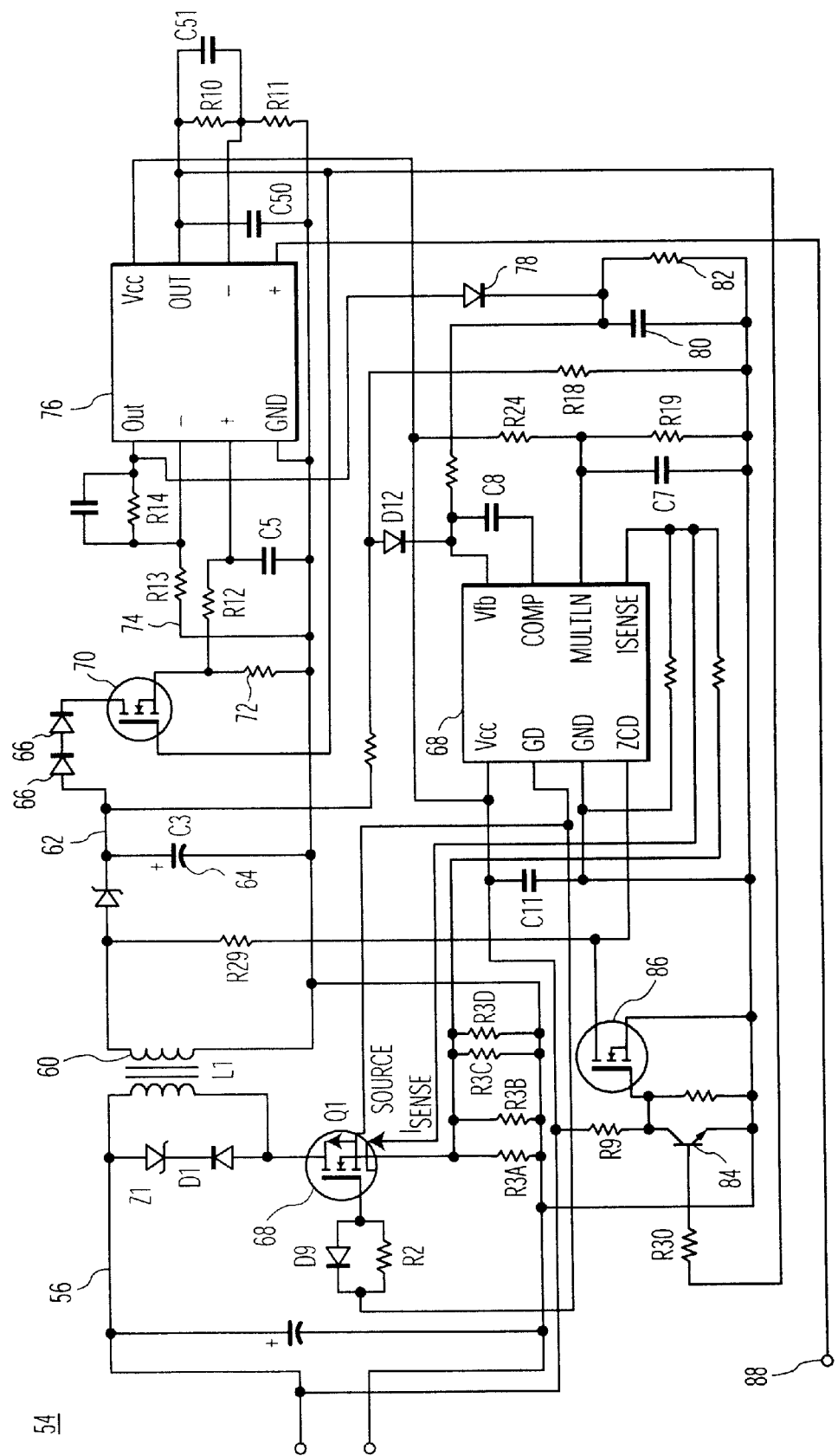
FIG. 3 shows an exemplary detailed schematic of an LED switching control circuit according to another embodiment of the present invention.

FIG. 3 shows an exemplary detailed schematic of an LED switching control circuit 54 according to another embodiment of the present invention. An exemplary input voltage of 15 volts DC at rail 56, is converted by switching device 58 and flyback transformer 60 to provide a DC supply voltage to node 62, capacitor 64, and LEDs 66. A standard UPC device 68 controls the pulse-width-modulated (PWM) signal to switching device 58, such that a constant regulated voltage that is independent of input voltage 56 is applied to capacitor 64. The input voltage and converter configuration shown in FIG. 3 is exemplary only, and not meant to be restricting. Many different configurations and input voltages can be used with the same effect, for example, an AC rectified line voltage being converted using a push-pull converter or inverter arrangement.

Completing the current path is transistor 70, which connects LEDs 66 to sensing resistor 72 and the ground return. A voltage signal 74 that is proportional to the current through LEDs 66 is then sensed by linear amplifier module 76, which amplifies the signal provides the amplified signal to a peak detector circuit comprising diode 78, capacitor 80 and resistor 82. By selecting the RC time constant of the peak detector circuit to be larger than the frequency of the PWM control circuitry, a voltage signal results that is proportional to the peak current in LEDs 66.

During an on state of transistor 70, the peak current in LEDs 66 can be controlled by this voltage level in order to maintain a desired conduction current. During off state of transistor 70, the sensed current drops to zero almost instantaneously and can cause the now unloaded voltage on capacitor 64 to rise and overshoot due to the slow response time of the control loop. Accordingly, UPC device 68 must be inhibited in synchronization with transistor 70 turn-off, which is implemented via transistors 84 and 86 and input PWM control signal 88.

Digital PWM control signal 88 thus passes through amplifier device 76 and controls the above transistors, such that when transistor 70 is on, transistor 84 is on and transistor 86 is off and UPC device 68 and the peak detector circuit operate normally. In the exemplary circuit shown in FIG. 3, this state corresponds to a high logic state at control signal 88. When a logic low is present at PWM signal 88, transistor 70 turns off and transistor 86 turns on, thereby inhibiting the operation of UPC device 68 and the peak detector circuit. During the on time of transistor 86, the peak detector circuit stores the previously retained voltage value, and the voltage on capacitor 64 remains constant, since there is no discharge path for the duration of the PWM signal 88 being at a logical low level. (i.e. transistor 70 being in an "off" state). When the next logical high level on PWM signal 88 occurs, transistor 70 turns on at the same level as before the turn-off, with the result that no overshoot occurs.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. An apparatus for controlling voltage and current in a switched LED array that is energized via a switched voltage converter, comprising:
    a semiconductor switching device for connecting the LED array to a voltage biasing rail from the switched voltage converter;
    a current detecting means for generating a signal proportional to a current being conducted through the LED array during an activation time; and
    a sample and hold means for retaining the generated signal during an inactivation time.

2. The apparatus according to claim 1, further comprising a synchronizing means for aligning the activation time of the LED may to an activation time of the switched voltage converter.

3. The apparatus according to claim 1, wherein the switched voltage converter is a flyback converter.

4. The apparatus according to claim 1, wherein the switched voltage converter is a push-pull converter.

5. The apparatus according to claim 1, wherein the switched voltage converter operates on an input voltage that is a DC voltage signal.

6. The apparatus according to claim 1, wherein the switched voltage converter operates on an input signal that is a rectified AC voltage signal.

7. The apparatus according to claim 1, wherein the current detecting means comprises a resistor.

8. The apparatus according to claim 7, wherein the current detecting means further comprises an amplification means for boosting a signal level of the generated signal.

9. The apparatus according to claim 1, wherein the sample and hold means comprises a diode, a capacitor, and a resistor.

10. The apparatus according to claim 9, wherein the response time of the sample and hold means is longer than a frequency of operation of the switched voltage converter.

11. The apparatus according to claim 1, wherein the synchronizing means comprises a means for inhibiting operation of the switched voltage converter.

12. An apparatus for transferring energy from a source to a load, comprising:
    a first semiconductor switching device;
    an energy storage element coupled to the first semiconductor switching device;
    a second semiconductor switching device coupled to the energy storage element;
    a timing control means for activating the first and second semiconductor switching devices; and
    a synchronizing means for aligning the time of activation and deactivation of the first and second semiconductor switching devices to a predetermined time.

13. The apparatus according to claim 12, wherein the energy storage element is a capacitor.

14. The apparatus according to claim 12, wherein the synchronizing means comprises logic circuits activated by a single logic signal.

15. A method for synchronizing a switching LED driver to a switched voltage converter having an activation time period and an inactivation time period, comprising:
  a) activating the switched LED driver simultaneously with the activation time period of the switched voltage converter;
  b) storing a signal corresponding to the peak current conducted through the LED during that activation time period;
  c) inactivating the LED driver simultaneously with the inactivation time period of the switched voltage converter; and
  d) inhibiting discharge of the stored peak current signal.

16. The method according to claim 15, wherein storing of the peak current signal is implemented as a sample and hold circuit.

17. An apparatus, comprising:
  a semiconductor switch for connecting an LED array to a voltage biasing rail from a switched voltage converter;
  a current detector for generating a signal proportional to a current being conducted through the LED array during an activation time; and
  a sample and hold circuit for retaining the signal during an inactivation time.

18. An apparatus, comprising:
  a first semiconductor switch;
  an energy storage element coupled to the first semiconductor switch;
  a second semiconductor switch coupled to the energy storage element;
  a timing controller for activating the first and second semiconductor switches; and
  a synchronizer for aligning the time of activation and deactivation of the first and second semiconductor switches to a predetermined time.

* * * * *